United States Patent [19]

Saruwatari

[11] 4,391,882
[45] Jul. 5, 1983

[54] BATTERY CONNECTING DEVICE

[75] Inventor: Shigeto Saruwatari, Chigasaki, Japan

[73] Assignee: Matsushita Electric Industrial Co., Ltd., Osaka, Japan

[21] Appl. No.: 308,940

[22] Filed: Oct. 5, 1981

[30] Foreign Application Priority Data

Oct. 8, 1980 [JP] Japan ............................ 55/144521[U]

[51] Int. Cl.³ .............................................. H01M 2/20
[52] U.S. Cl. ......................................... 429/96; 429/97
[58] Field of Search .................................... 429/96–97, 429/99, 100

[56] References Cited

U.S. PATENT DOCUMENTS 2,461,002  2/1949  Riggs ................................... 429/96
4,355,695  10/1982  Leskovec ......................... 429/96 X Primary Examiner—Anthony Skapars
Attorney, Agent, or Firm—Stevens, Davis, Miller & Mosher

[57] ABSTRACT

A battery connecting device for mounting a power source battery in a battery accommodating space of an electronic appliance. The device includes a plurality of resilient strip-like connection terminals attached directly to a wall defining the battery accommodation space by means of slits formed in the wall. In consequence, the size of the battery accommodation space and, hence, the size of the electronic appliance as a whole can be reduced advantageously.

4 Claims, 16 Drawing Figures

BATTERY CONNECTING DEVICE

The present invention relates to a battery connecting device for use in electronic appliances which make use of batteries as the power source.

An object of the invention is to provide a battery connecting device which can contribute to the reduction of the size of an electronic appliance which is operated by a power supplied from batteries.

Another object of the invention is to provide a battery connecting device which can facilitate and smooth the insertion of batteries in a battery holder of an electronic appliance.

Still another object of the invention is to provide a battery connecting device is constructed to facilitate the connection between a connecting terminal to which the batteries are connected and an electric circuit.

The foregoing objects and other objects as well as the characteristic features of the invention will become more apparent and more readily understandable by the following description and the apended claims when read in conjunction with the accompanying drawings.

Figure 1:
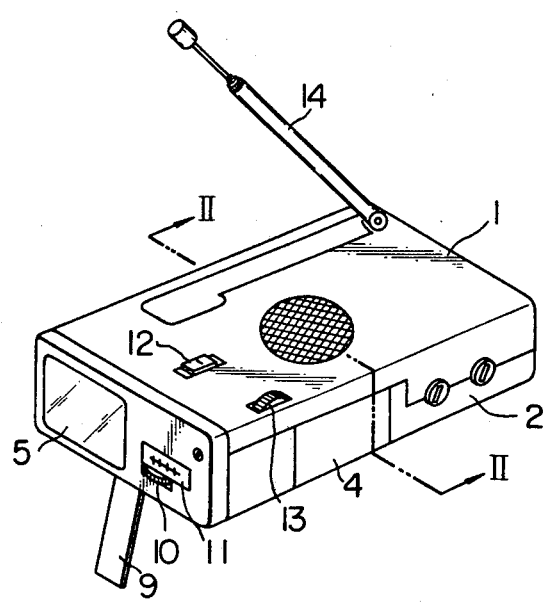
FIG. 1 is a perspective view of a television receiver to which the present invention is applicable.

Referring first to FIG. 1, there is shown a small-sized television receiver to which the present invention is applicable. The television receiver generally designated at a reference numeral 1 has a cathode ray tube of 1½ inch size. There are many restrictions in size in the small-sized television receiver as shown in FIG. 1.

Figure 2:
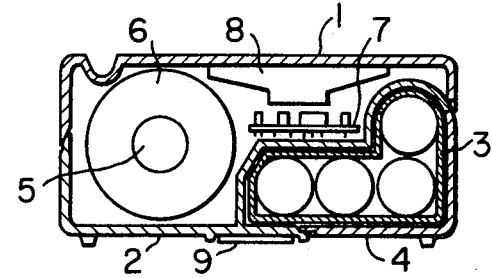
FIG. 2 is a sectional view taken along the line II—II of FIG. 1.

FIG. 2 illustrates the television receiver shown in FIG. 1 in section to show how the batteries are set in the television receiver. In FIGS. 1, 2, a reference numeral 1 denotes an upper cabinet, 2 denotes a lower cabinet, 3 denotes a chargeable battery pack, 4 denotes a battery lid, 5 denotes a cathode ray tube, 6 denotes a deflector yoke, 7 denotes a printed circuit board a part of the television circuit is formed, 8 denotes a speaker, 9 denotes a set leg, 10 denotes a tuning knob, 11 denotes a dial indicator, 12 denotes a band change-over switch, 13 denotes a power and volume knob and 14 denotes an UHF/VHF rod antenna.

As will be seen from this Figure, the battery pack 3 consists of an Ni-Cd battery corresponding to 4 pieces of dry cells. From the shape of the battery pack 3, it will be understood how densely the parts are arranged due to restriction in space. This dense arrangement of parts applies also to the portion around the battery terminals shown in FIG. 3. The size and construction of the battery connecting device are the factors which largely affect the length and width of the television set.

Accordingly, it is a key for designing a small-sized set to reduce the size of the battery connecting device in the direction of the net length $H_L$ of the battery pack.

FIGS. 4a, 4b and 5a, 5b show typical examples of battery connecting device conventionally used in television receivers.

Figure 4A:
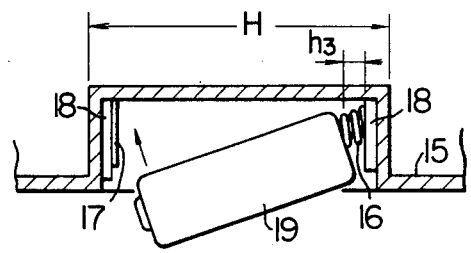
FIGS. 4a and 4b show an example of conventional battery connecting device.
Figure 4B:
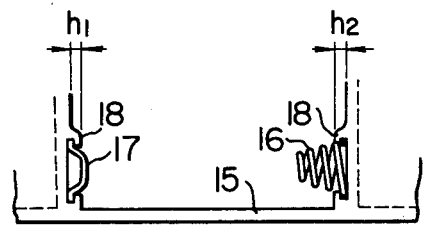

More specifically, the battery connecting device shown in FIGS. 4a, 4b has a battery case 15 in which formed are ribs 18 for carrying a negative electrode terminal 16 and positive electrode terminal 17. More specifically, a tabular processed member as the positive electrode terminal 17 is attached to one of the ribs 18, while a coiled spring as the negative electrode terminal 16 is attached to the other of the ribs 18. To insert a battery 19, the negative electrode side of the battery 19 is pressed against the spring to compress the latter, and the positive electrode of the battery is slided on the positive electrode terminal 17 as illustrated.

Figure 5A:
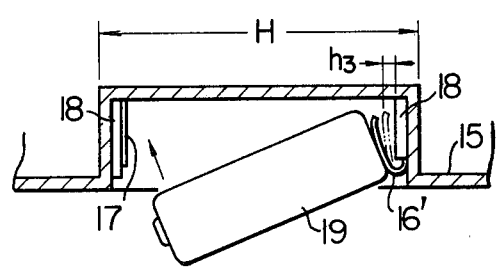
FIGS. 5a and 5b show another example of conventional battery connecting device.
Figure 5B:
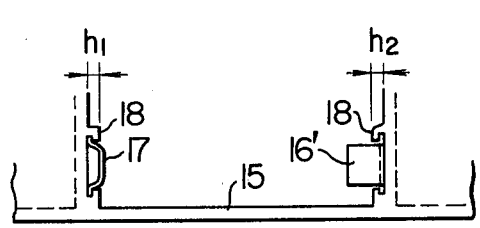

In the battery connector shown in FIGS. 5a and 5b, the coiled spring constituting the negative electrode terminal 16 shown in FIGS. 4a, 4b is substituted by a leaf spring 16' attached to the rib 18. The battery is inserted substantially in the same manner as that in the arrangement shown in FIGS. 4a and 4b.

These conventional battery connecting devices involve two problems. Namely, a first problem is that the overall length H of the battery case is undesirably long. More specifically, the length H is large due to the presence of ribs 18 having heights $h_1$, $h_2$ for attaching the positive and negative electrode terminals 16, 16', 17. In addition, a clearance $h_3$ is necessary for maintaining the suitable contact pressure exerted by the spring. Thus, at least a length which is the sum of $h_1$, $h_2$ and $h_3$ has to be added to the length of the battery, resulting in a long length of the battery case and, hence, a large size of the television set as a whole.

Figure 3:
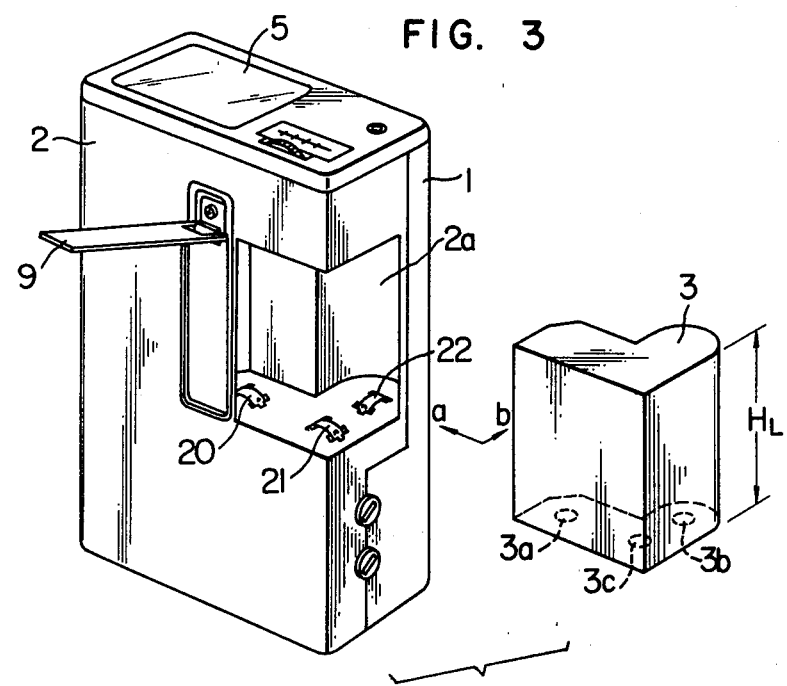
FIG. 3 is an exploded perspective view of the television receiver shown in FIG. 1 with a battery pack detached therefrom.

The second problem is concerned with the way of putting the batteries 19 into the battery case 15. There is no substantial difficulty in putting the batteries if the batteries 19 are put one by one in the battery case as in the arrangement shown in FIGS. 4a, 4b and 5a, 5b. The user, however, faces a difficulty in setting the batteries when the batteries are united in the form of, for example, the Ni-Cd cell pack 3 shown in FIG. 3, because in this battery pack a positive electrode terminal 3a, negative electrode terminal 3b and the charging electrode terminal 3c are concentrated to one side of the pack and because the pack as a whole has a complicated shape to accommodate 4 pieces of cells. In putting this battery pack 3 in the battery accommodating chamber 2a, the pack 3 is at first pushed in the direction of arrow (a) and then in the direction of arrow (b) in FIG. 3. If the battery connector of the type shown in FIGS. 4a, 4b or FIGS. 5a, 5b is to be used in the battery accommodating space 2a for accommodating the battery pack as shown in FIG. 3, it is quite difficult to secure the coil spring or leaf spring constituting the negative electrode terminal 16. Even if the spring can be secured correctly, the battery cannot smoothly put into the space 2a because of an interference with the negative electrode terminal. In the arrangement shown in FIG. 3, the battery accommodating space 2a is constituted in combination of a first recess formed in the bottom surface of the lower cabinet 2 and a second recess formed in one side surface of the lower cabinet 2, and, needless to say, has a configuration conforming with that of the battery pack 3.

This problem, however, is completely overcome by the battery connector of the invention as will be understood from the following description.

Figure 6:
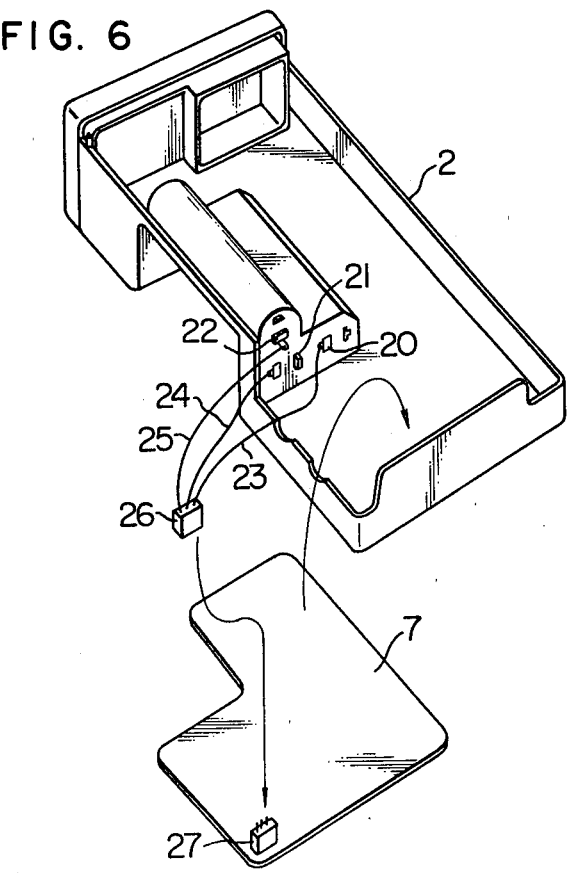
FIG. 6 is an exploded perspective view of a battery connecting device in accordance with an embodiment of the invention.

FIG. 3 shows in perspective view the manner of attaching of connection terminals in accordance with the invention, with a battery lid 4 being removed, while FIG. 6 is a perspective view as viewed from the bottom side to show how these connection terminals 20, 21, 22 are attached. Leads 23, 24 and 25 are connected at their one ends by soldering to the connection terminals 20, 21, 22 and at their other ends to a connector 26 adapted to be coupled to a mating connector 27 which leads to the printed circuit board 7.

The connection terminals 20 to 22 have an identical construction.

Figure 8:
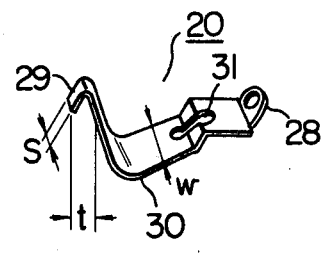
FIG. 8 is a perspective view of a connection terminal in accordance with the invention.

As a representative, the construction of the connection terminal 8 is shown in FIG. 8. The connection terminal 20 consists of a resilient thin strip-like member which is processed by a press work to have a lead brazing portion 28 at its one end and a narrowed bend constituting a retainer tab 29 of a reduced width S at its other end. The intermediate portion of the terminal 20 is resiliently bent to form a curved terminal contact portion 30. A longitudinal slit 31 is formed in the terminal 2 to provide an adequate resiliency or spring force of each terminal 20, 21, 22.

Hereinafter, an explanation will be made as to how the terminals of the battery connecting device of the invention are attached, with reference to FIGS. 7 thru 13.

Figure 7:
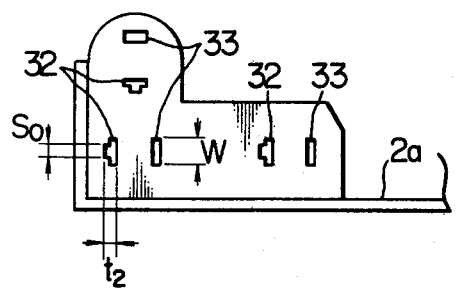
FIG. 7 is a front elevational view of a battery case in accordance with the invention.

As will be seen from FIG. 7, a plurality of pairs of slits, each consisting of a first slit 32 and a second slit 33, are formed in a wall in the battery accommodating space 2a. The wall is perpendicular to both of the bottom and side surfaces of the lower cabinet 2. The number of pairs of slit corresponds to the number of the connection terminals 20 to 22. The first slit 32 has a width $S_o$ and a thickness $t_2$ slightly greater than those of the retainer tab 29 to permit the latter to pass therethrough with a small clearance. The first slit 32 has an overall width W slightly greater than the width w of the connection terminal 20, 21, 22 in order to receive the latter with a slight clearance. Also, the second slit 33 has a thickness $t_3$ and a width W sized to permit the insertion of the end including the retainer tab 29.

Figure 9:
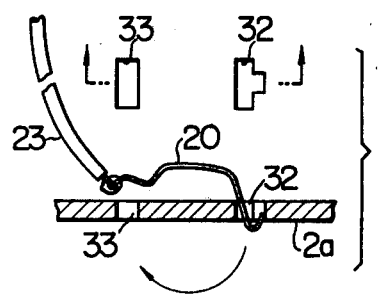
FIGS. 9, 10 and 11 are sectional views illustrating the process for attaching the connection terminal to the battery case.
Figure 10:
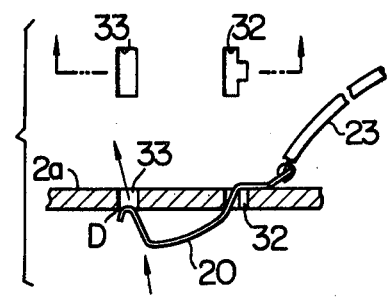
Figure 11:
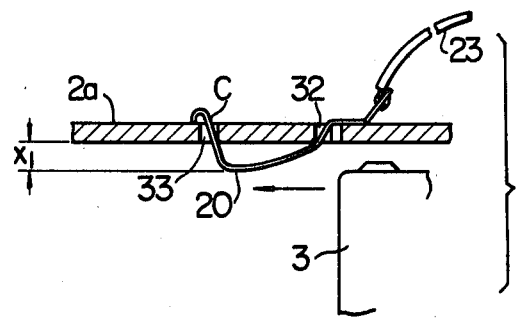

FIGS. 9 to 11 in combination show how the connection terminals are inserted and fitted to these slits 32, 33.

First of all, as will be seen from FIG. 9, the bent end of the connection terminal 20 having the retainer tab 29 is inserted through the first slit 32. Then, the connection terminal 20 is rotated in the direction of arrow in FIG. 9 and is pulled to permit the bent end of the retainer tab 29 to be inserted into the slit 33 from the rear side of the latter. In this state, the outer extremity of the bent end of the connection terminal 20 makes a contact with a point D of the second slit 33. However, since in this state the retainer tab 29 is already partially received by the slit 33, the bent end of the connection terminal 20 is slided into the slit 33 as the connection terminal 20 is pressed in the direction of the arrow in FIG. 10, so that the connection terminal 20 fits in the slit 33 in such a manner that the portion below a point C is received by the slit 33 as will be seen from FIG. 11.

Figure 13:
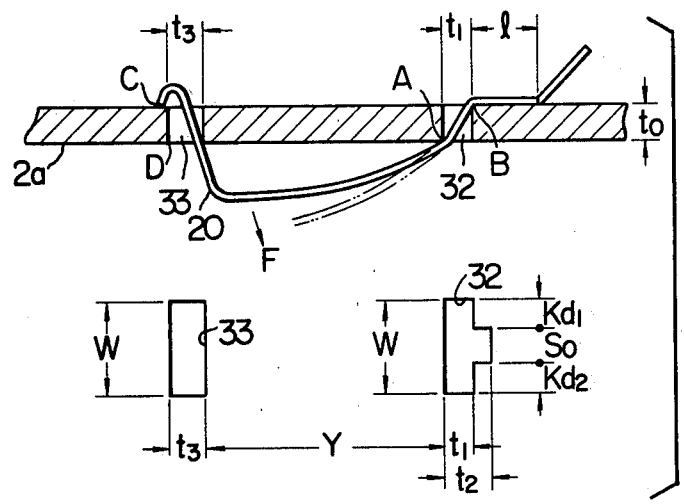
FIG. 13 is a view for illustrating a phenomenon by which a reactional force F is generated when the connection terminal is attached.

Since a reactional force F acts on the connection terminal 20 in this state as shown in FIG. 13, the retainer tab 29 does never come off from the point C once the connection terminal 20 is attached in the manner described.

An explanation will be made hereinunder as to the reactional force F. Referring to FIG. 13, the point B of the connection terminal 20 has a total widthwise length which is the sum of lengths of the sides $kd_1$ and $kd_2$, while the point A has a widthwise length corresponding to the width W of the slit 32. Therefore, as the connection terminal 20 is fitted by resiliently deforming it from the state shown by the broken lines to the state shown by the full lines, the points A and B act as fulcrum points of a lever, to generate a reactional force F. The case 2a, therefore, should have a thickness large enough to overcome the reactional force F. The length l of the connection terminal 20 is selected suitably to facilitate the insertion into the slits 32, 33.

Figure 12:
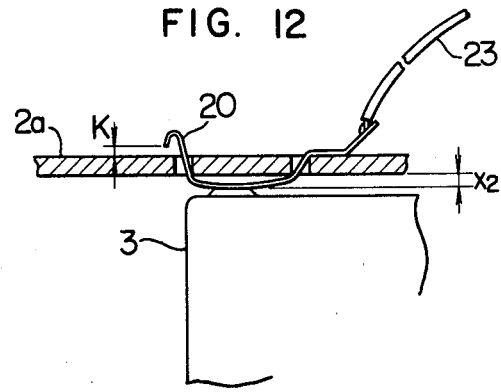
FIG. 12 is a sectional view of a battery connecting device of the invention in the state loaded with batteries.

Then, as the battery pack 3 is inserted in the direction of the arrow in FIG. 11, the terminals 3a to 3c of the battery pack 3 receive reactional forces corresponding to the displacement K of the retainer tabs 29 of the connection terminals 20, 21, 22 as shown in FIG. 12. It will be seen that the reactional force produces a suitable contact pressure between each terminal of the battery pack 3 and corresponding connection terminal. Thus, if the connection requires three connection terminals as shown in FIG. 3 or 6, these three connection terminals are secured at positions corresponding to the positions of the terminals of the battery pack 3. In such a case, the directions in which the connection terminals extend are suitably selected taking into account the direction of insertion of the battery pack 3.

More specifically, in the arrangement shown in FIG. 3, three connection terminals 20, 21, 22 are disposed to correspond to the positive electrode terminal 3a, the negative electrode terminal 3b and the charging electrode terminal 3c, respectively. In addition, since the battery pack 3 is inserted at first in the direction of arrow (a) and then in the direction of arrow (b), the connection terminals 20 and 21 are disposed to extend in the same directions, while the connection terminal 22 is disposed to extend at a right angle to these two connection terminals 20, 21. As to the positions of the slits 32, 33, the first slit 32 is disposed at the outer side of the second slit 33 for each connection terminal as viewed in the direction of insertion of the connection terminal, in order to smooth the movement of the battery pack 3 on each connection terminal.

The connection terminal 20 is deflectable between a state shown in FIG. 11 in which the distance between the terminal 20 and the lower surface of the case 2a is $x_1$ and a state shown in FIG. 12 in which the distance is $x_2$, and an electric contact between the connection terminal 20 and the associated terminal of the battery pack 3 is maintained within this region of resilient deflection of the connection terminal 20.

The adjustment of the contact pressure between the terminal 20 and the battery pack 3 can be made by means of the slit 31 shown in FIG. 8 for adjusting the spring force, as well as by varying the thickness of the connection terminal 20. In the case where the terminals 3a, 3b, 3c of the battery pack 3 have a substantial size, or in the case where a specifically high smoothness of the insertion is required, the distance Y (See FIG. 13) between the first and second slits 32, 33 is selected to be large correspondingly.

Figure 14:
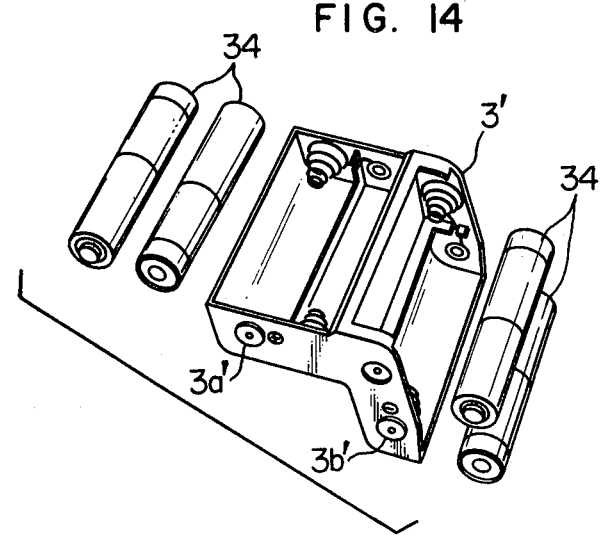
FIG. 14 is an exploded perspective view of a dry cell battery adapter usable in the battery connecting device of the invention.

Although in the described embodiment and Ni-Cd battery pack 3 is used as the battery, this is not exclusive and the battery connecting device of the invention of the described embodiment can equally be applied to the connection for dry cell batteries. In such a case, an adapter having the same shape and size as the aforementioned Ni-Cd battery pack 3 is used. An example of such an adapter is shown in FIG. 14. Namely, the adapter has a battery case 3' provided at its one side with a positive electrode terminal 3a' and negative electrode terminal 3b' corresponding to the connection terminals 20 and 22 shown in FIG. 3. The battery case 3' is sized and shaped to accommodate 4 (four) dry cells 34 as illustrated in such a manner that these dry cells 34 are connected in series in the case 3'. This battery adapter can be inserted and fitted in the same manner as the battery pack 3 described heretofore.

As will be understood from the foregoing description, the battery connection device of the invention offers the following advantages.

(1) As to the mounting of the connection terminals in the battery accommodation space, it is not necessary to use specific ribs which have been necessary in the conventional device to mount the positive and negative terminals as shown in FIGS. 4 and 5. Namely, according to the invention, the connection terminals are directly inserted into slits formed in the wall defining the battery accommodating space having a thickness $t_o$. In consequence, the overall length H of the battery accommodating space can remarkably be reduced to permit the size of the electronic appliances as a whole.

(2) The conventional battery connecting device does not suffer any substantial problem provided that the batteries can be inserted at an inclination while compressing the spring constituting the negative electrode as shown in FIGS. 4a, 4b and 5a, 5b. However, in the case where the batteries have to be inserted laterally by a translational movement as in the case of the battery shown in FIG. 5, the conventional battery connecting devices shown in FIGS. 4a, 4b and 5a, 5b cannot provide the smooth insertion because of the interference between the connection terminals and electrode terminals of the battery. The connection terminals of the invention is entirely free from this problem because the connection terminals can be arranged independently in such directions as to facilitate the insertion of the battery. In consequence, it is possible to smoothly inserted even a battery having a complicated configuration as shown in FIG. 3.

(3) As has been explained in connection with FIGS. 9 to 12, the connection terminals in accordance with the invention can be attached to the wall defining the battery accommodation space from the opposite side to the battery, i.e. from the inside of the electronic appliance. This conveniently permits the connection terminals to be solded beforehand to the connector terminal as shown in FIG. 6, so that the soldering, as well as connection to the printed circuit board, can be achieved easily.

(4) In the conventional battery connecting devices as shown in FIGS. 4a, 4b and 5a, 5b, the positions of the connection terminals, i.e. the positions of the ribs are impractically limited due to various reasons such as the direction of the withdrawal of the molded article from the mold or the strength of the mold. According to the invention, it is possible to attach the connection terminals to any portion of the wall as desired, because the connection terminals are attached simply by insertion into slits formed in the wall.

Although the invention has been described through specific terms, it is to be noted that the described embodiments are not exclusive and various changes and modifications may be imparted thereto without departing from the scope and spirit of the invention which are limited solely by the attached claims.

What is claimed is:

1. A battery connecting device comprising: at least a connection terminal constituted by a resilient strip-like member having one end soldered to a lead and the other end bent to form a retainer tab, the intermediate portion of said strip-like member being bent resiliently to form a contact portion of said connecting terminal; and a wall defining a battery accommodating space and having a first slit adapted to permit at least said retainer tab and said contact portion of said connection terminal to pass therethrough and a second slit adapted to permit at least said retainer tab to pass therethrough, said connection terminal being directly attached to said wall through said first and second slits in such a manner that said contact portion appears at the same side of said wall as the battery while said retainer tab and said end soldered to said lead appear at the opposite side of said wall to said battery and that a reactional force is generated to press said contact portion of said connecting terminal toward said battery.

2. A battery connecting device as claimed in claim 1, wherein a plurality of pairs of slits each consisting of said first and second slits are formed in the same wall defining said battery accommodating section and that a plurality of connection terminals are inserted to respective pairs of said slits so as contact portion to extend in the direction of insertion of said battery.

3. A battery connecting device as claimed in claim 2, wherein three connection terminals including a positive electrode terminal, negative electrode terminal and a charging electrode terminal are used and two of said connection terminals being arranged in parallel to each other while the remainder one connection terminal is arranged at a right angle to the parallel connection electrodes.

4. A battery connection device as claimed in claim 2, wherein said first and second slits of each pair of slits are arranged such that said first slit is disposed at the outer side of said second slit as viewed in the direction of insertion of the associated connection terminal.

* * * * *